United States Patent
Behle et al.

(10) Patent No.: US 8,832,242 B2
(45) Date of Patent: *Sep. 9, 2014

(54) DETERMINING A NETWORK ADDRESS FOR MANAGED DEVICES TO USE TO COMMUNICATE WITH MANAGER SERVER IN RESPONSE TO A CHANGE IN A CURRENTLY USED NETWORK ADDRESS

(75) Inventors: Brad J. Behle, Rochester, MN (US); Hourselt Andrew G., Tucson, AZ (US); Hu Pei M., Shanghai (CN); Ricketts Ashaki A., Shanghai (CN); Jia M. Zhang, Shanghai (CN); Lei L W Wei, Shanghai (CN)

(73) Assignee: International Business Machines Corporation, Armonk, NY (US)

(*) Notice: Subject to any disclaimer, the term of this patent is extended or adjusted under 35 U.S.C. 154(b) by 135 days.

This patent is subject to a terminal disclaimer.

(21) Appl. No.: 13/456,167

(22) Filed: Apr. 25, 2012

(65) Prior Publication Data

US 2013/0290509 A1 Oct. 31, 2013

(51) Int. Cl.
G06F 15/177 (2006.01)
G06F 15/16 (2006.01)

(52) U.S. Cl.
USPC .......................................... 709/221; 709/228

(58) Field of Classification Search
USPC ................................................ 709/221, 228
See application file for complete search history.

(56) References Cited

U.S. PATENT DOCUMENTS

| | | | |
|---|---|---|---|
| 7,069,344 B2 * | 6/2006 | Carolan et al. | 709/250 |
| 7,072,994 B2 * | 7/2006 | Britton | 710/9 |
| 7,284,048 B2 | 10/2007 | Jakobson et al. | |
| 7,559,065 B1 | 7/2009 | Sosnovsky et al. | |

(Continued)

FOREIGN PATENT DOCUMENTS

| | | |
|---|---|---|
| CN | 101163072 | 4/2008 |
| JP | 2007140712 | 6/2007 |
| WO | 2008069240 | 6/2008 |
| WO | 2010006207 | 1/2010 |

OTHER PUBLICATIONS

U.S. Appl. No. 13/796,900, filed Mar. 12, 2013, entitled "Determining a Network Address for Managed Devices to Use to Communicate with Manager Server in Response to a Change in a Currently Used Network Address", invented by B.J. Behle et al., Total 31 pp. [18.448C1 (Appln)].

(Continued)

Primary Examiner — Lance L Barry
(74) Attorney, Agent, or Firm — David W. Victor; Konrad Raynes Davda & Victor LLP

(57) ABSTRACT

A plurality of network addresses identify a source device in the network. A plurality of subscriptions for the source device to receive messages from the target devices each identify one of the target devices and one of the source network addresses the identified target device uses to communicate with the source device. Upon detecting a change to a changed network address, a determination is made of a subscription indicating the changed network address and the target device indicated in the determined subscription is determined. A selection is made of a selected network address, other than the changed network address is selected. If the selected network address can be used to communicate between the determined target device and the source device, then the selected network address is used and provided to the determined target device.

22 Claims, 7 Drawing Sheets

(56) References Cited

U.S. PATENT DOCUMENTS

| | | | |
|---|---|---|---|
| 7,711,831 B2* | 5/2010 | Aiken et al. | 709/228 |
| 7,877,464 B2 | 1/2011 | Colvig et al. | |
| 7,953,830 B2* | 5/2011 | Foster et al. | 709/221 |
| 8,010,793 B2 | 8/2011 | Hoshino et al. | |
| 8,291,012 B2 | 10/2012 | Gupta et al. | |
| 2003/0046395 A1 | 3/2003 | Fleming et al. | |
| 2004/0133664 A1* | 7/2004 | Colvig et al. | 709/221 |
| 2009/0296567 A1* | 12/2009 | Yasrebi et al. | 370/221 |
| 2010/0106772 A1 | 4/2010 | Gupta et al. | |
| 2010/0121871 A1 | 5/2010 | Takeoka et al. | |
| 2011/0258325 A1 | 10/2011 | Benfield et al. | |

OTHER PUBLICATIONS

Preliminary Remarks, dated Mar. 12, 2013, for U.S. Appl. No. 13/796,900, filed Mar. 12, 2013 by B.J. Behle et al., Total 2 pp. [18.448C1].

Office Action dated Sep. 11, 2010, pp. 12, for U.S. Appl. No. 13/456,167, filed Feb. 20, 2013.

PCT International Search Report & Written Opinion dated Sep. 5, 2013 for Application No. PCT/IB2013/053185 filed Apr. 23, 2013, pp. 9.

English Translation of JP2007140712 Jun. 7, 2007 Hitachi Software Eng.

English Translation of CN101163072 Apr. 16, 2008 Minghui Lin.

English Translation of WO2008069240 Jun. 12, 2008 Ntt Docomo Inc.

US20100121871 is the English language counterpart of WO2008069240 Jun. 12, 2008 Ntt Docomo Inc.

US20100106772 and 8291012 are the English language counterparts of WO2010006207 Jan. 14, 2010 Qual-Comm Incorporated.

Response dated Dec. 11, 2013, pp. 7, to Office Action dated Sep. 11, 2013, pp. 12, for U.S. Appl. No. 13/896,900, filed Mar. 12, 2013.

* cited by examiner

DETERMINING A NETWORK ADDRESS FOR MANAGED DEVICES TO USE TO COMMUNICATE WITH MANAGER SERVER IN RESPONSE TO A CHANGE IN A CURRENTLY USED NETWORK ADDRESS

BACKGROUND OF THE INVENTION

1. Field of the Invention

The present invention relates to a computer program product, system, and method for determining a network address for managed devices to use to communicate with a management server in response to a change in a currently used network address.

2. Description of the Related Art

A management server may manage multiple connected managed devices over one or more networks. The management server establishes network connections with the managed devices so that the managed devices can transmit event notifications to the management server so that the server may perform typical management operations, such as configuring the managed devices in the networks, providing updates, handling failover and failback procedures, etc.

The management server maintains separate subscriptions and protocols on multiple networks to receive notifications from the managed devices. Subscriptions provide information on connections with the managed devices and on the communication protocols used to communicate with the managed devices, such as Storage Management Initiative—Specification (SMI-S), Common Information Model (CIM), proxy providers, native Application Programming Interface (API) providers, Tivoli Storage Productivity Center (TPC) Storage Resource Groups, and direct event subscription on devices.

There is a need in the art for improved techniques for maintaining network addresses used by the managed devices to initiate a connection to communicate with the management server, such as for sending alerts and notifications.

SUMMARY

Provided are a computer program product, system, and method for determining a network address for managed devices to use to communicate with a management server in response to a change in a currently used network address. A plurality of network addresses identify a source device in the network. A plurality of subscriptions for the source device to receive messages from the target devices each identify one of the target devices and one of the source network addresses the identified target device uses to communicate with the source device. Upon detecting a change to a changed network address, a determination is made of a subscription indicating the changed network address for communication with one of the target device. The target device indicated in the determined subscription is determined and a selected network address comprising one of the network addresses other than the changed network address is selected. A determination is made as to whether the selected network address can be used to establish a connection that enables communication between the determined target device and the source device. In response to determining that the selected network address can be used to establish the connection, indication is made to use the selected network address for communication with the determined target device and the selected network address is provided to the determined target device indicated in the determined subscription for the determined target device to use to send messages to the source device.

DETAILED DESCRIPTION

Described embodiments provide techniques to determine a source network address for a source device to use to connect to one or more target devices over a network in the event that one of the source network addresses being used for communication with target devices has changed, such as is no longer available. Described embodiments consider the available source network addresses and target network configuration settings to select a source network address that a given target device uses to communicate to the source device.

Figure 1:
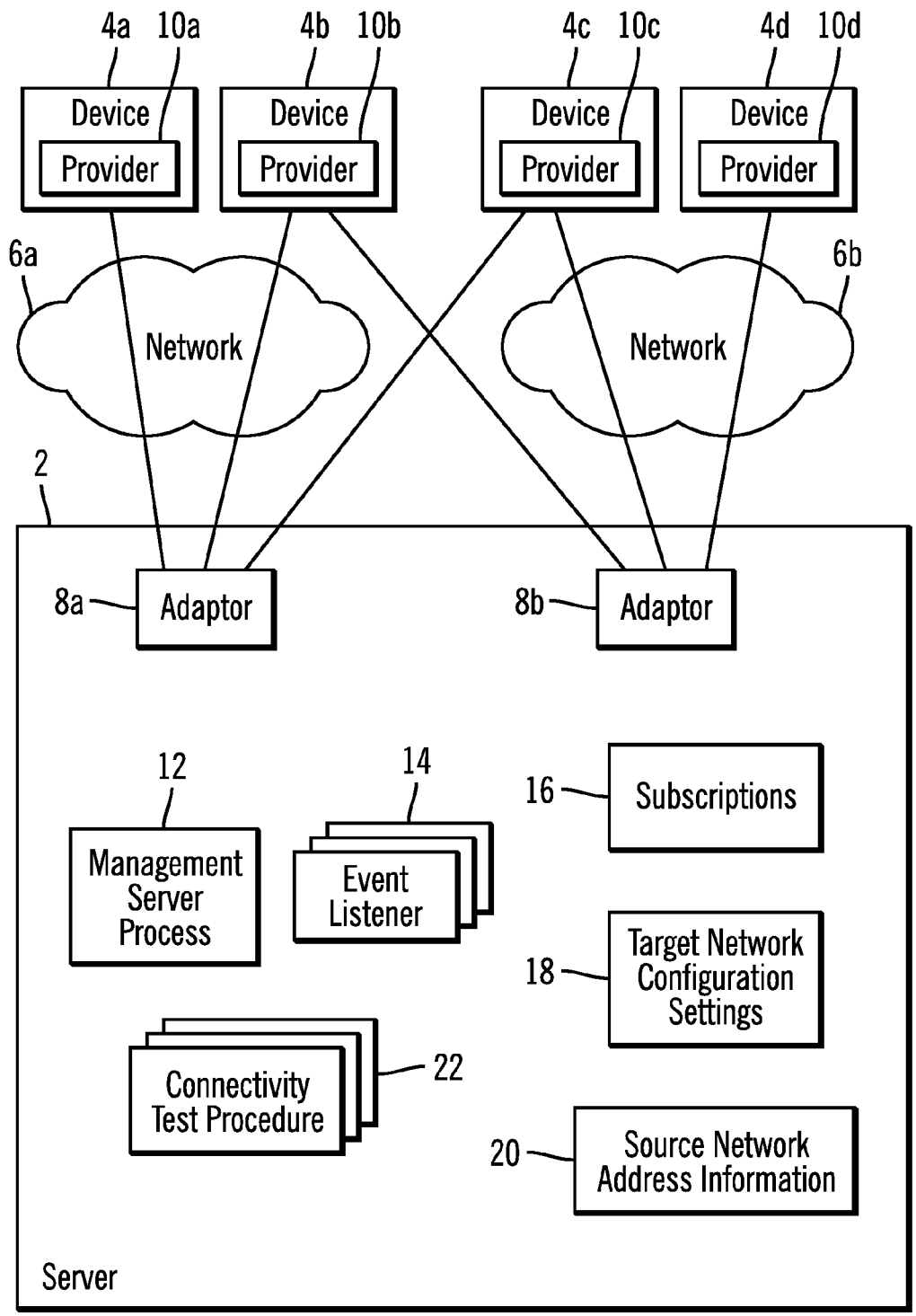
FIG. 1 illustrates an embodiment of a network computing environment.

FIG. 1 illustrates an embodiment of a network computing environment comprised of a server 2 that connects to managed devices 4a, 4b, 4c, 4d over one or more networks 6a, 6b. The server 2 includes network adaptors 8a, 8b that have ports to provide connections to one or more of the devices 4a, 4b, 4c, 4d over communication paths through the networks 6a, 6b. The communication paths through the networks 6a, 6b may include routers, switches, devices, backbones, etc. Each of the devices 4a, 4b, 4c, 4d may connect to the server 2 via one or more networks 6a, 6b. For instance, devices 4b and 4c connect through both networks 6a, 6b to the server 2. Each port and connection path to one of the devices 4a, 4b, 4c, 4d may be associated with a different network address, such as a different Internet Protocol (IP) address. Although FIG. 1 shows a certain number of devices, networks, server and adaptor, further embodiments may include fewer or more of the adaptor, network device, and server components than shown in FIG. 1.

The server 2 includes a management server process 12 to provide management of heterogeneous or similar device types. The managed devices 4a, 4b, 4c, 4d may comprise device types such as storage, switch, printer, database, copy services, backup services and other computational services and managed elements. Each device 4a, 4b, 4c, 4d includes a provider 10a, 10b, 10c, 10d comprising a device specific handler that serves as a plug-in used by a management server process 12 to interface with the device 4a, 4b, 4c . . . 4m being managed. In certain embodiments, the provider 10a, 10b, 10c, 10d is a "proxy provider" comprising a program installed on another server instead of being embedded in the device.

Further, the provider 10a, 10b, 10c, 10d may be located outside of the device 4a, 4b, 4c, 4d, and may be installed on another server in the network.

The server 2 includes the management server process 12 to manage the devices 4a, 4b, 4c, 4d using one or more management and communication protocols, such as the Common Information Model (CIM), Storage Management Initiative—Specification (SMI-S), Secure Shell Protocol (SSH), etc. The management server process 12 spawns event listeners 14 to listen for events and notifications from the devices 4a, 4b, 4c, 4d that are being managed. There may be one event listener 14 for each subscription to monitor for messages and notifications to a source network address from the device 4a, 4b, 4c, 4d using that source network address to communicate with the server 2. The management server process 12 maintains subscriptions 16 providing information on each connection, such as the source and destination addresses, to one of the managed devices 4a, 4b, 4c, 4d and the target network configuration settings 18 for the subscription. The target network configuration settings for a managed device 4a, 4b, 4c, 4d provide information on the one or more destination network addresses and communication protocols used to communicate with the managed device 4a, 4b, 4c, 4d. Source network address information 20 provides information on each source network address that may be used to reach the server 2 through one of the adaptors 8a, 8b. The management server process 12 further maintains connectivity test procedures 22 for the different communication protocols that provide communication protocol specific operations to test the ability of the managed device to communicate with the server 2 using the specified communication protocol. Each connectivity test procedure 22 provides protocol specific methods and operations to invoke methods on the communication protocol provider 10a, 10b, 10c, 10b to test a connection using a specified source network address and communication protocol.

The networks 6a, 6b may comprise a same type of network, e.g., Local Area Network (LAN), Storage Area Network (SAN), use a different network protocol, such as Internet Protocol version 4 (IPv4), Internet Protocol version 6 (IPv6), or may comprise different types of networks that use different network protocols to communicate.

Figure 2:
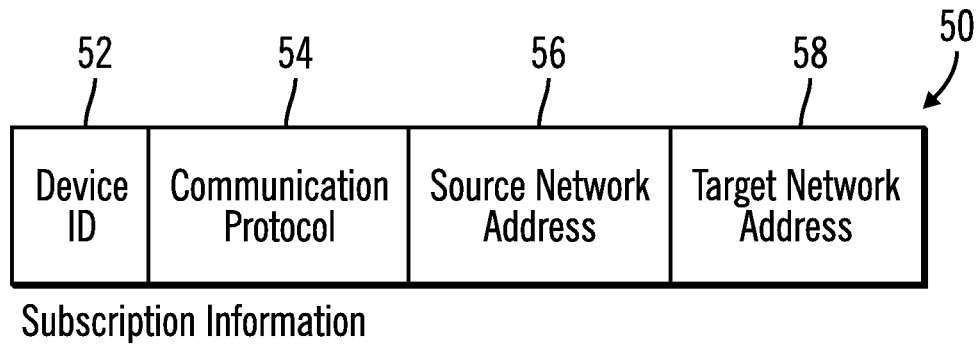
FIG. 2 illustrates an embodiment of subscription information.

FIG. 2 illustrates an embodiment of an instance of subscription information 50 in the subscriptions 16 including a device identifier (ID) 52, comprising one of the managed devices 4a, 4b, 4c, 4d; a communication protocol 54 used to communicate with the device 52, e.g., CIM; a source network address 56 for a port on the server adaptor 8a, 8b; and a target network address 58 at the device 52, where a connection is formed from the target network address 58 to the source network address 56 for transmissions, such as events and notifications sent to the management server 2 upon detecting a change to a source network address 56. There may be multiple subscriptions 50 for one device 4a, 4b, 4c, 4d if there are different source network addresses, target network addresses and/or communication protocols used to establish communication between the server 2 and the managed device 4a, 4b, 4c, 4d over one or more networks 6a, 6b. In further embodiments, the subscription information 50 may include additional fields. For instance, the subscription information 50 may include an associated query that filters the events subscribed to.

Figure 3:
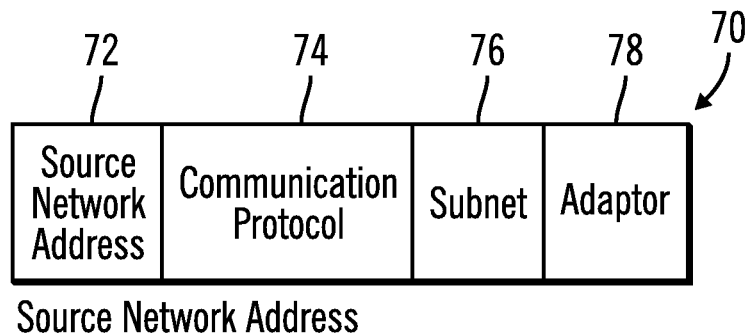
FIG. 3 illustrates an embodiment of source network address information.

FIG. 3 illustrates an embodiment of an instance of source network address information 70 maintained in the source network address information 20 for one network address used by the server 2. The instance 70 for one source network address includes a source network address 72; a communication protocol 74 used for communicating on that address 72; a subnetwork address 76 of the network 6a, 6b; and an adaptor 78 and port ID used for that source network address 72.

Figure 4:
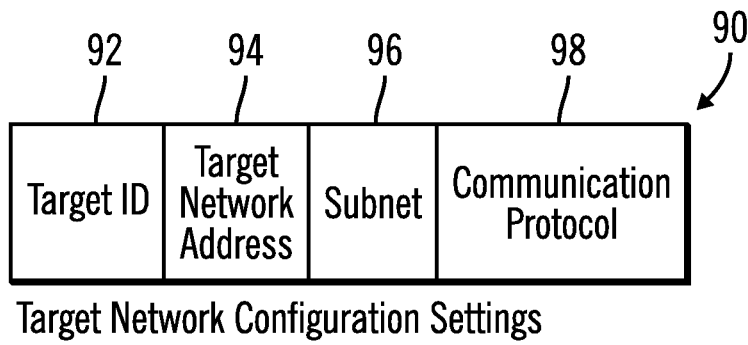
FIG. 4 illustrates an embodiment of target network configuration settings.

FIG. 4 illustrates an embodiment of an instance of target network configuration settings 90 maintained in the target network configuration settings 18, including a target identifier (ID) 92 of one of the managed devices 4a, 4b, 4c, 4d; a target network address 94 of the target device 92 in the network 6a, 6b; a subnet 96 of the target network address 94; and a communication protocol 98 used to communicate and manage the target device 92, e.g., CIM. There may be multiple instances of target network configuration settings 90 for one device 4a, 4b, 4c, 4d if that device has multiple adaptor ports to use different target network addresses to communicate on one or more of the networks 6a, 6b to the server 2.

Figure 5A:
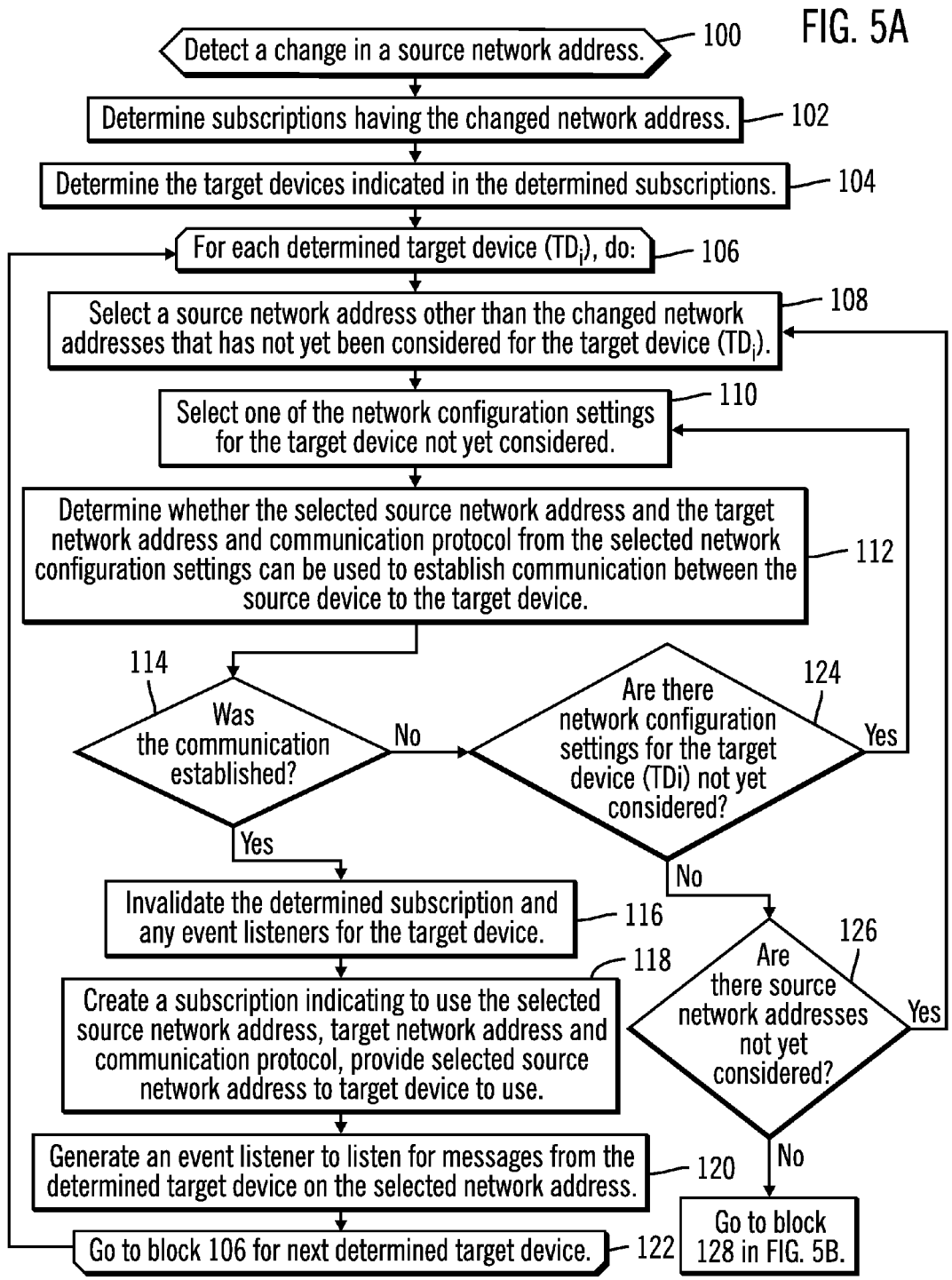
FIGS. 5a and 5b illustrates an embodiment of operations to update the source network address the managed devices use to connect to the management server to send messages, such as events and notifications.
Figure 5B:
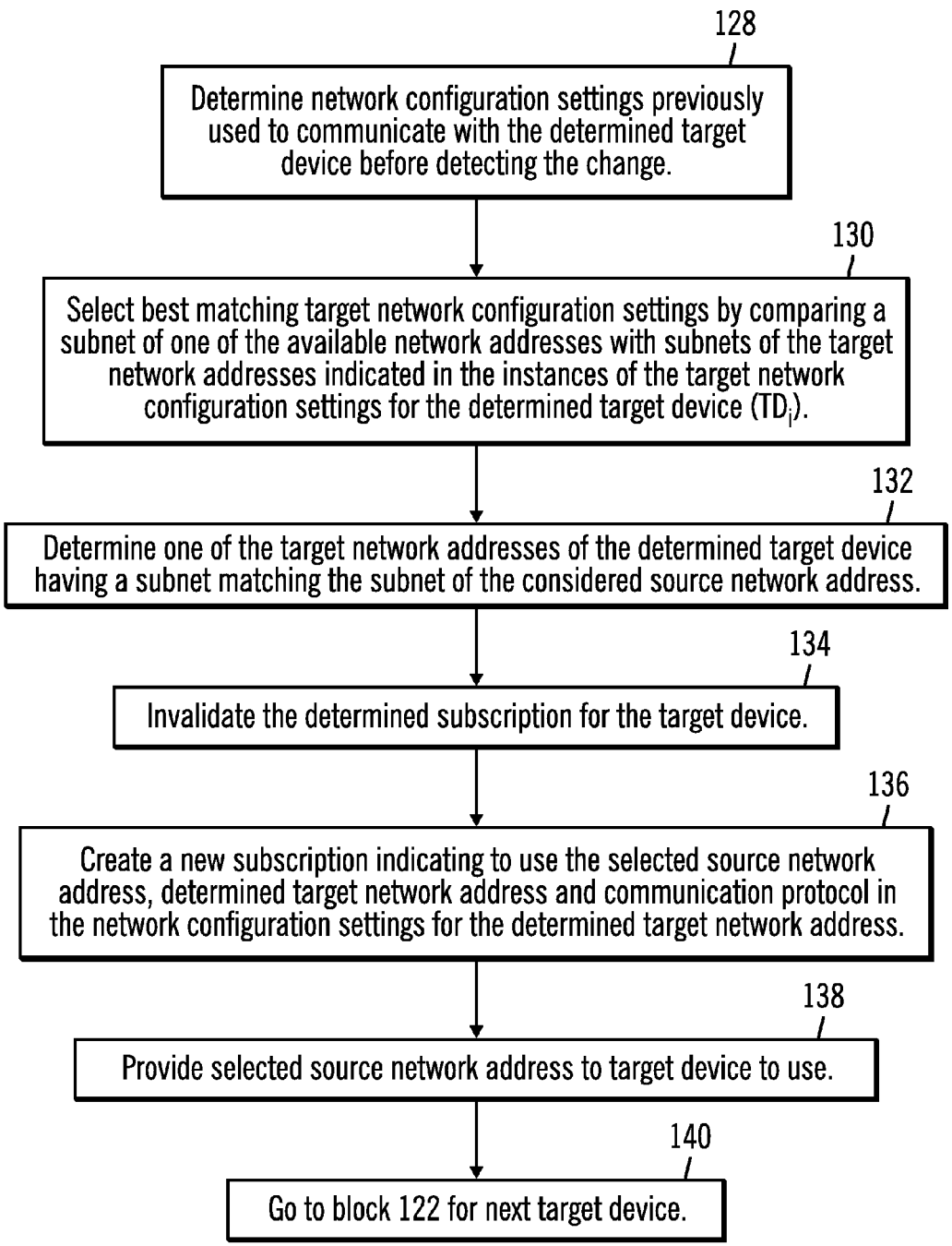

FIGS. 5a and 5b illustrate an embodiment of operations performed by the management server process 12 to select a source network address to use to communicate with the managed devices 4a, 4b, 4c, 4d upon detecting a change to the source network address used to communicate with the managed devices 4a, 4b, 4c, 4d. As discussed, the management server process 12 maintains subscription 16 having information on source network addresses monitored by the event listeners 14 for communications and notifications from the managed devices 4a, 4b, 4c, 4d to the source network addresses of the server 2. If the source network address used to communicate between the server 2 and one or more of the managed devices 4a, 4b, 4c, 4d is changed or is no longer available, then a new source network address must be selected to use to connect to the managed devices 4a, 4b, 4c, 4d. The change of a source network address may also involve adding a source network address, such as if an adaptor 8a, 8b is replaced, thus removing one previously used source network address to replace with new source network addresses for the new adaptor 8a, 8b. Upon (at block 100) detecting a change in a source network address, the management server process 12 determines (at block 104) subscriptions 50 having the changed network address as the source network address 56 (FIG. 3). The target devices in the determined subscriptions having the changed source network address are determined (at block 104). A loop of operations is performed for each determined target device ($TD_i$) to update the source network address 56 in the subscription 50 for that target device.

For a determined target device ($TD_i$), a source network address is selected (at block 108) comprising one of the source network addresses other than the changed network address that has not yet been considered for the target device ($TD_i$). The selected source network address may comprise a new address, an unchanged previously existing address, or a newly changed address. If a network address is added to the server 2 as part of the detected change to the source network addresses, then, in one embodiment, the first source network address to consider may comprise the new source network address added to the server 2 by adding or changing the configuration of an adaptor 8a, 8b. The management server process 12 further selects (at block 110) one of the target network configuration settings 90 for the target device 4a, 4b, 4c, 4d not yet considered. The first selected protocol to try may comprise the communication protocol 54 used for the subscription 50 being updated. The management server process 12 determines (at block 112) whether the selected source network address and the target network address and communication protocol from the selected network configuration settings can be used to establish communication between the source device to the target device, using the target network address 94 of the target network configuration settings 90. This may involve testing both the connectivity from the server 2 to the device 4a, 4b, 4c, 4d, and from the device 4a, 4b, 4c, 4*d* to the server 2. If (at block 114) communication was established, then the management server process 12 invalidates the determined subscription 50 and any event listeners 14 for the target device 4*a*, 4*b*, 4*c*, 4*d*. The management server process 12 creates (at block 118) a subscription 50 (FIG. 2) indicating to use the selected source network address, target network address and communication protocol. Further, the selected source network address is passed to the device 4*a*, 4*b*, 4*c*, 4*d* to use to communicate with the server 2. The management server process 12 further generates (at block 120) an event listener 14 to listen for and handle messages form the determined target device 4*a*, 4*b*, 4*c*, 4*d* on the selected source network address. From block 120, control proceeds (at block 122) back to block 106 to consider the next determined target device in a subscription 50 whose source network address 56 has changed.

If (at block 114) the management server process 12 cannot establish communication with the determined target device (TD$_i$), then the management server process 12 determines (at block 124) whether there are network configuration settings 90 for the target device (TDi) that have not yet been considered. If there are yet unconsidered target network configuration settings 90 for the target device (TD$_i$), then control proceeds back to block 110 to select another network configuration setting 90 for the target device (TD$_i$). If there are no further target network configuration settings 90 to consider for the target device (TD$_i$), then the management server process 12 determines whether there are source network addresses that have not yet been considered for connection with the target device (TD$_i$). If (at block 126) there are yet unconsidered source network addresses to consider to connect to the target device (TD$_i$), then control proceeds back to block 108 to select another source network address to consider for connection to the target device (TD$_i$).

If (at block 126) there are no further source network addresses to consider for connecting to the target device (TD$_i$), then control proceeds to block 128 in FIG. 5*b* where the management server process 12 determines target network configuration settings 90 previously used to communicate with the determined target device (TD$_i$) before detecting the change. The management server process 12 then selects (at block 130) best matching target network configuration settings 90. In one embodiment, the best matching target network configuration settings 90 may be determined by comparing a subnet of one of the available network addresses with subnets of the target network addresses indicated in the instances of the target network configuration settings 90 for the determined target device (TDi). If a new source network address has been added to the server 2, then the operation at block 130 may be performed by comparing the subnet of the new source network address to the subnets of the target network addresses. The management server process 12 determines (at block 132) one of the target network addresses of the determined target device (TD$_i$) having a subnet matching the subnet of the considered source network address. Devices 4*a*, 4*b*, 4*c*, 4*d* on the same subnet will have a greater likelihood of successfully communicating. The current determined subscription 50 is invalidated (at block 134) and a new subscription 50 is created (at block 136) indicating to use the selected source network address and the determined target network address and communication protocol indicated in the target network configuration settings 90 for the determined target network address. Alternatively, the management server process 12 may update the subscription having the outdated source network address instead of deleting the old subscription 50. The selected source network address is provided (at block 138) to the target device (TDi) to use. Control then proceeds back to block 122 in FIG. 5*a* to select a next target device (TDi) to consider.

Figure 6:
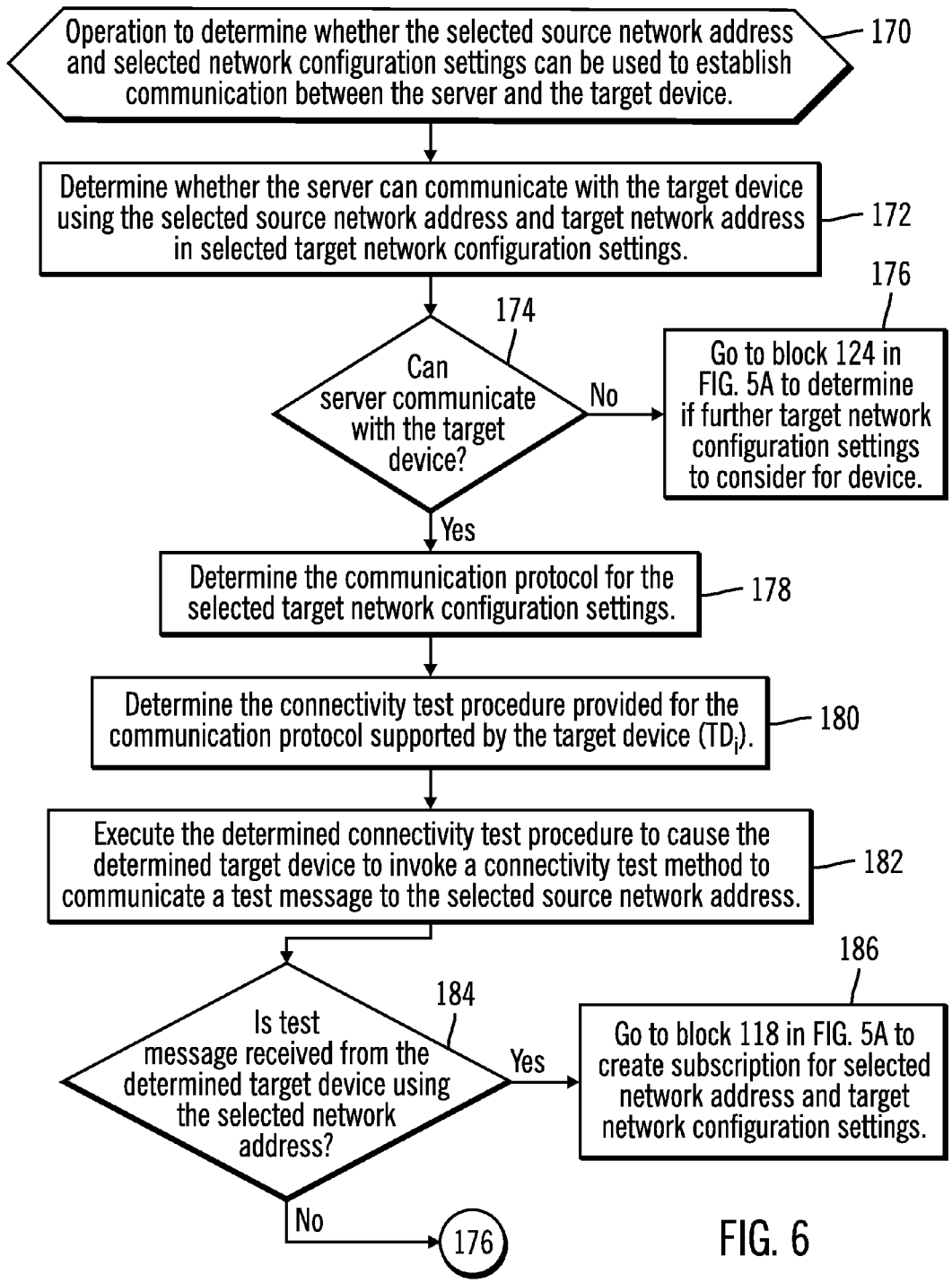
FIG. 6 illustrates an embodiment of operations to determine whether a source network address and the target network configuration settings can be used to establish a connection between the server and the target device.

FIG. 6 illustrates an embodiment of operations performed by the management server process 12 to determine whiter a selected source network address and target network configuration settings can be used to establish communication between the server 2 and target device (TD$_i$), such as determined at block 112 in FIG. 5*a*. Upon initiating the operation (at block 170) to determine connectivity, the management server process 12 determines (at block 172) whether the server 2 can communicate with the target device (TD$_i$) using the selected source network address and the target network address 94 in the selected target network configuration settings 90 (FIG. 4). In one embodiment, the determination at block 172 may be performed by the management server process 12 contacting the target device (TD$_i$) with a synchronous query, such as a ping, socket connection attempt or (if credentials are available) an SSH connection attempt or a simple CIM query, to confirm connectivity. If (at block 174) the server 2 cannot communicate with the target device (TD$_i$), then control proceeds to block 124 in FIG. 5*a* to determine if there are further target network configuration settings 90 to consider for the selected source network address and the target device (TD$_i$).

Figure 7:
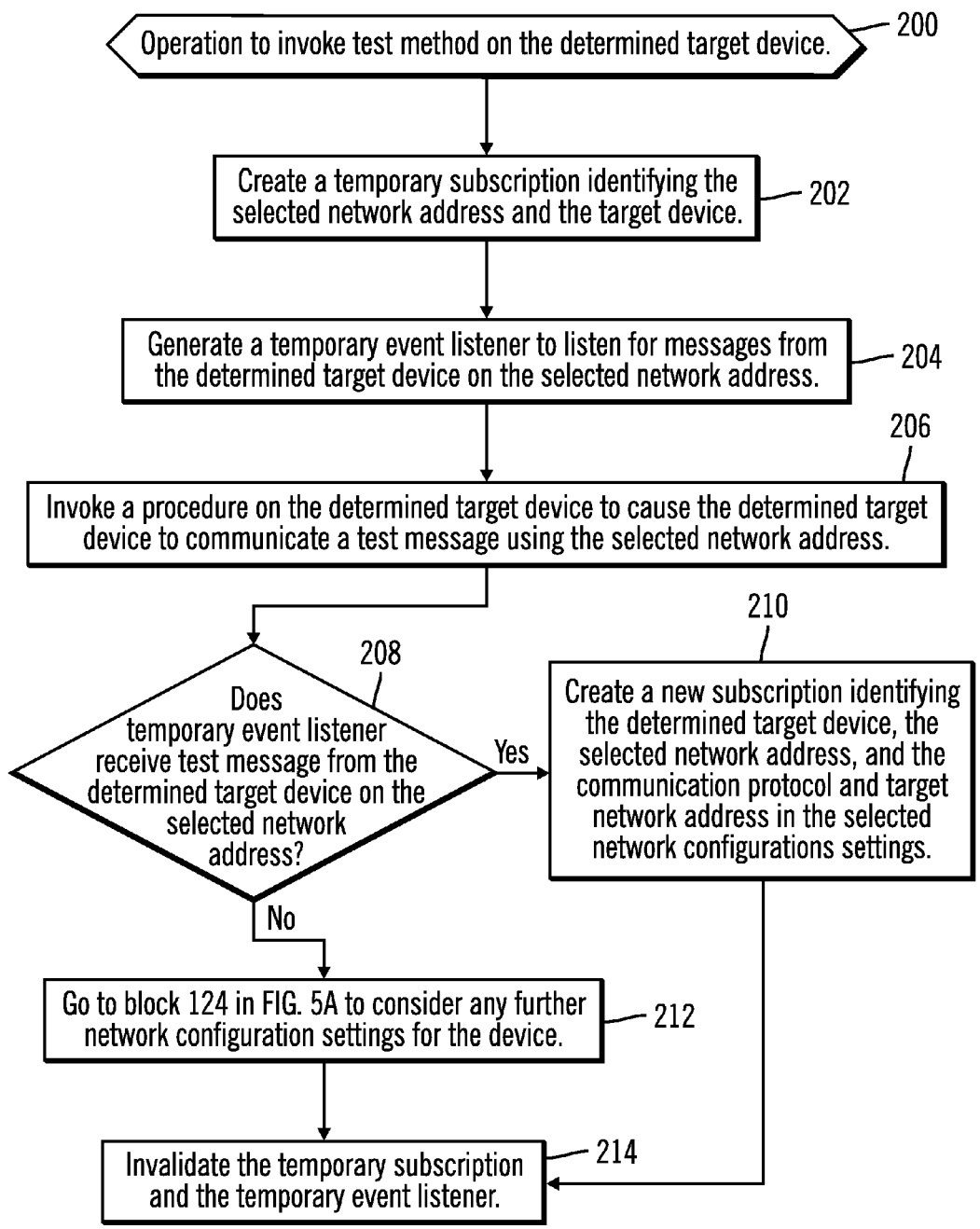
FIG. 7 illustrates an embodiment of operations to test the connection from the target device to the server.

If (at block 174) the server 2 can communicate with the target device (TD$_i$), then the management server process 12 determines (at block 178) the communication protocol 74 for the selected target network configuration settings 70 (FIG. 3). The management server process 12 then determines (at block 180) the connectivity test procedure 22 provided for the determined communication protocol 74 supported by the target device (TD$_i$). The management server process 12 executes (at block 182) the determined connectivity test procedure 22 to cause the target device (TD$_i$) to invoke a connectivity test method to communicate a message, such as a test message, to the selected source network address. The operations of the connectivity test procedure 22 are communication protocol specific. For instance, for SSH managed devices, the connectivity test procedure 22 may invoke a method on the target device (TDi) to ping and port test the new source network address. For CIM managed devices, the connectivity test procedure 22 may cause the target device (TDi) CIM provider 10*a*, 10*b*, 10*c*, 10*d* to invoke a connectivity test method implemented in the CIM protocol. FIG. 7 illustrates a further embodiment of a connectivity test procedure 22 for protocols that do not provide a certain connectivity test method for the devices 4*a*, 4*b*, 4*c*, 4*d* to implement.

After executing the determined connectivity test procedure 22, if (at block 184) the test message is received from the target device (TD$_i$) using the selected network address, then control proceeds (at block 186) to block 118 in FIG. 5*a* to create a subscription for the selected network address and target network configuration settings 90. Otherwise, if the test failed, then control proceeds to block 176 to consider if there are any further target network configuration settings or source network addresses to consider for connection with the target device (TD$_i$).

FIG. 7 illustrates an embodiment of operations for a connectivity test procedure 22 for certain communication protocols, such as communication protocols that do not implement a test connectivity method. The operations of FIG. 7 may be performed at block 182 in FIG. 6. Upon initiating (at block 200) the connectivity test procedure 22, the management server process 12 creates (at block 202) a temporary subscription 50 identifying the selected network address and the target device (TD$_i$). The current subscriptions and event listeners 14 for the target device (TD$_i$) using the changed source network address may have already been invalidated. The management server process 12 creates (at block 202) a temporary subscription 50 identifying the selected network address and the target device. A temporary event listener 14 is generated (at block 204) to listen for messages from the determined target device (TD$_i$) on the selected network address. The management server process 12 then invokes (at block 206) a procedure, using the communication protocol 90 of the selected target network configuration settings 90, on the determined target device (TD$_i$) to cause the determined target device (TD$_i$) to communicate a test message using the selected network address. If (at block 208) the temporary event listener 14 receives the test message from the target device (TD$_i$) on the selected network address, then the management server process 12 creates (at block 210) a new subscription 50 identifying the determined target device (TD$_i$), the selected network address, and the communication protocol and target network address in the selected network configurations settings 90. Otherwise, if (at block 208) the temporary event listener 14 does not receive the test message, control proceeds (at block 212) to block 124 in FIG. 5a to consider any further target network configuration settings 90 for the target device (TD$_i$). The temporary subscription 90 and temporary event listener 14 are invalidated (at block 214) after the test completes.

Described embodiments provide techniques to automatically determine a new source network address and target network configuration settings to use to connect from the managed devices 4a, 4b, 4c, 4d to the management server 2 if a currently used source network address has changed or become unavailable or invalid. For instance, if there is a failure in the network used by the source network address, then that source network address is no longer available and needs to be replaced with a new source network address, created by adding another network adaptor 8a, 8b or by using any available source network address. With described embodiments, the subscription information for managed devices is automatically updated so that the managed devices can continue sending messages and notifications to the management server process 12.

Figure 8:
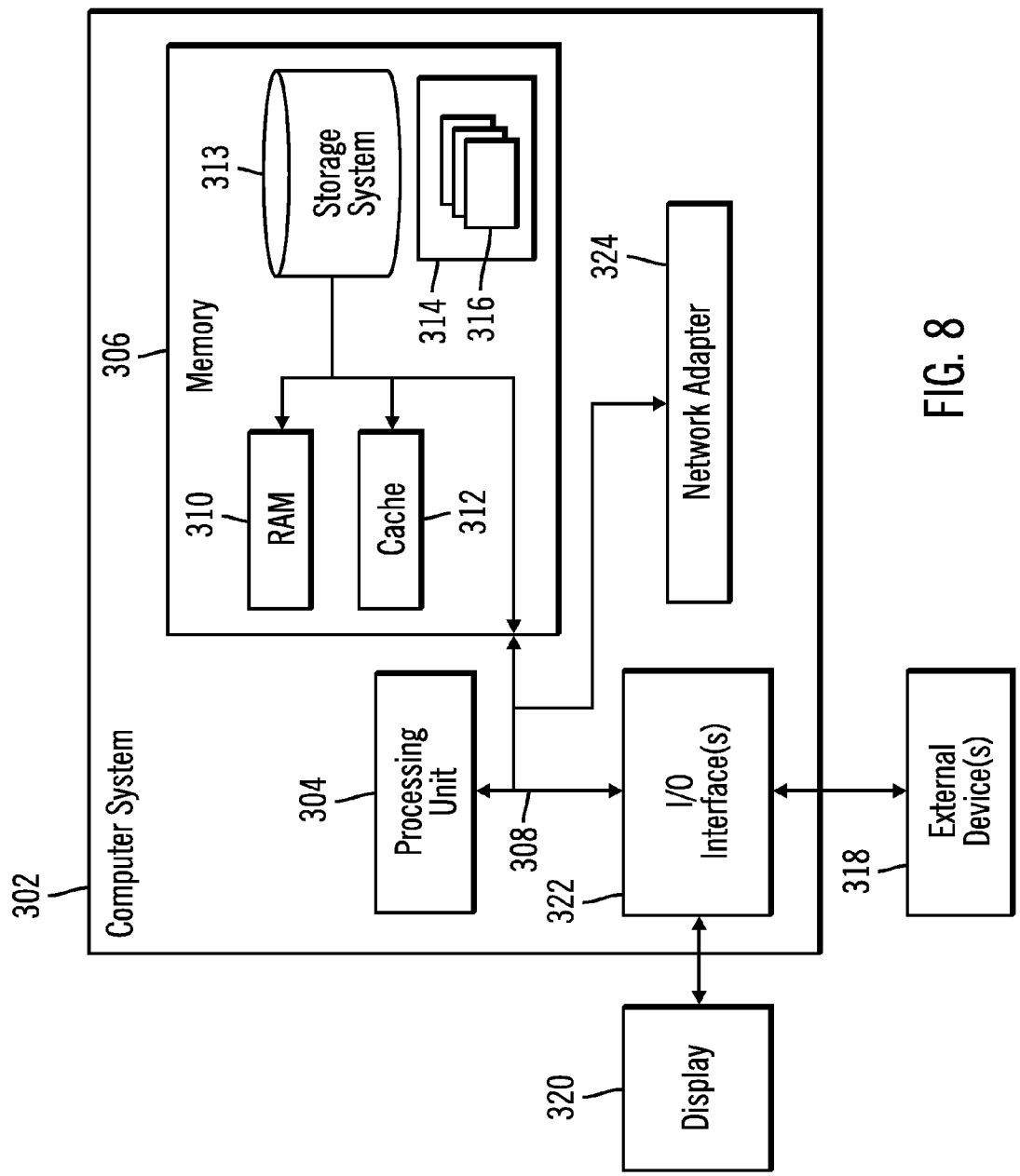
FIG. 8 illustrates an implementation of a computer/server node in the network computing environment.

FIG. 8 illustrates an embodiment of a computing node or computer 302 in the networks 6a, 6b, which may comprise an implementation of the server 2 and the managed devices 4a, 4b, 4c, 4d. Computer 302 is only one example of a computing node and is not intended to suggest any limitation as to the scope of use or functionality of embodiments of the invention described herein. Regardless, computing node 302 is capable of being implemented and/or performing any of the functionality set forth hereinabove.

The computer 302 is operational with numerous other general purpose or special purpose computing system environments or configurations. Examples of well-known computing systems, environments, and/or configurations that may be suitable for use with computer system/server 302 include, but are not limited to, personal computer systems, server computer systems, thin sources, thick sources, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 302 may be described in the general context of computer system executable instructions, such as program modules, being executed by a computer system. Generally, program modules may include routines, programs, objects, components, logic, data structures, and so on that perform particular tasks or implement particular abstract data types. Computer system 302 may be practiced in cloud computing environments where tasks are performed by remote processing devices that are linked through a communications network. In a distributed cloud computing environment, program modules may be located in both local and remote computer system storage media including memory storage devices.

As shown in FIG. 8, computer 302 is shown in the form of a general-purpose computing device. The components of computer 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer 302 typically includes a variety of computer system readable media. Such media may be any available media that is accessible by computer system/server 302, and it includes both volatile and non-volatile media, removable and non-removable media.

System memory 306 can include computer system readable media in the form of volatile memory, such as random access memory (RAM) 310 and/or cache memory 312. Computer system/server 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein.

Computer 302 may also communicate with one or more external devices 318 such as a keyboard, a pointing device, a display 320, etc.; one or more devices that enable a user to interact with computer system/server 12; and/or any devices (e.g., network card, modem, etc.) that enable computer system/server 302 to communicate with one or more other computing devices. Such communication can occur via Input/Output (I/O) interfaces 322. Still yet, computer system/server 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting an address to use to communicate between a source device and target devices over at least one network, wherein the computer program product comprises a computer readable storage device having computer readable program code embodied therein that executes to perform operations, the operations comprising:
   maintaining a plurality of network addresses to identify the source device in the at least one network;
   maintaining a plurality of subscriptions for the source device to receive messages from the target devices, wherein each subscription identifies one of the target devices and one of the source network addresses the identified target device uses to communicate with the source device;
   detecting a change to a changed network address;
   determining a subscription indicating the changed network address for communication with one of the target devices;
   determining the target device indicated in the determined subscription;
   selecting a selected network address comprising one of the network addresses other than the changed network address;
   determining whether the selected network address can be used to establish a connection that enables communication between the determined target device and the source device;
   in response to determining that the selected network address can be used to establish the connection, performing:
      indicating to use the selected network address for communication with the determined target device; and
      providing the selected network address to the determined target device indicated in the determined subscription for the determined target device to use to send messages to the source device.

2. The computer program product of claim 1, wherein the operations of determining whether the selected network address can be used to establish the connection comprises:
   determining whether the source device can communicate with the target device; and
   determining whether the determined target device can communicate with the source device in response to determining that the source device can communicate with the target device, wherein the determination is made that the selected network address can be used to establish the connection in response to determining that the source device can communicate with the target device and the target device can communicate with the source device.

3. The computer program product of claim 1, wherein the operations further comprise:
   deleting the determined subscription; and
   creating a new subscription identifying the determined target device and the selected network address.

4. The computer program product of claim 1, wherein the determining of whether the selected network address can be used to establish the connection comprises:
   causing an invocation of a connectivity test method on the determined target device to cause the determined target device to communicate a test message to the selected network address; and
   determining whether a test message is received from the determined target device sent to the selected network address, wherein the determination is made that the selected network address can be used to establish the connection in response to determining that the test message was received from the determined target device.

5. The computer program product of claim 1, wherein the operations further comprise:
   determining a communication protocol supported by the determined target device;
   maintaining connectivity test procedures for different communication protocols, wherein each connectivity test procedure invokes operations to cause the determined target device to send a test message using the selected network address;
   determining the connectivity test procedure provided for the communication protocol supported by the determined target device;
   executing the determined connectivity test procedure to cause the determined target device to communicate using the selected network address; and
   determining whether a test message is received from the determined target device using the selected network address, wherein a determination is made that the selected network address can be used to establish the connection in response to determining that the test message was received from the determined target device.

6. The computer program product of claim 5, wherein the operations further comprise:
  determining whether the determined target device supports at least one additional communication protocol in response to determining that the test message is not received from the determined target device after executing the operations of the determined connectivity test procedure; and
  selecting one of the determined at least one additional communication protocol, wherein the operations of determining the connectivity test procedure, executing the operations of the determined connectivity test procedure, and determining whether the test message is received are performed with respect to the selected additional communication protocol.

7. The computer program product of claim 1, wherein the determining whether the selected network address can be used to establish a connection that enables communication with the determined target device comprises:
  creating a temporary subscription identifying the selected network address and the determined target device;
  generating a temporary event listener to listen for messages from the determined target device on the selected network address; and
  invoking a procedure on the determined target device to cause the determined target device to communicate a message using the selected network address, wherein a determination is made that the selected network address can be used to establish the connection in response to the temporary event listener receiving the message.

8. The computer program product of claim 7, wherein in response to determining that the selected network address can be used to establish the connection, further performing:
  invalidating the temporary event listener and the temporary subscription;
  creating a new subscription identifying the determined target device and the selected network address; and
  generating an event listener to listen for messages from the determined target device on the selected network address.

9. The computer program product of claim 1, wherein the operations further comprise:
  determining that the network addresses other than the changed network address cannot be used to establish the connection that enables communication with the determined target device; and
  in response to determining that the network addresses other than the changed network address cannot be used to establish the connection, performing:
    determining network configuration settings previously used to communicate with the determined target device before detecting the change; and
    using the determined network configurations settings with one of the network addresses other than the changed network address for communication with the determined target device.

10. The computer program product of claim 9, wherein the determining of the network configuration settings previously used to communicate with the determined target device comprises:
  selecting one of a plurality of instances of network configuration settings for the determined target device, wherein the instances of network configuration settings are used for communication with the determined target device over one or more networks, wherein each instance of the network configuration settings identifies a target network address and communication protocol to use to communicate with the determined target device.

11. The computer program product of claim 10, wherein the determining the network configurations settings previously used comprises:
  selecting one of the network addresses other than the changed network address;
  comparing a subnet of the selected network address with subnets of the target network addresses of the determined target device indicated in the instances of the network configuration settings; and
  determining one of the target network addresses of the determined target device having a subnet matching the subnet of the new network address, wherein the determined network configuration settings include the determined target network address of the determined target device having the subnet matching the subnet of the new network address.

12. A system for selecting an address to use to communicate between a source device and target devices over at least one network, comprising:
  a processor; and
  a computer readable storage device having executed by the processor to perform operations, the operations comprising:
    maintaining a plurality of network addresses to identify the source device in the at least one network;
    maintaining a plurality of subscriptions for the source device to receive messages from the target devices, wherein each subscription identifies one of the target devices and one of the source network addresses the identified target device uses to communicate with the source device;
    detecting a change to a changed network address;
    determining a subscription indicating the changed network address for communication with one of the target devices;
    determining the target device indicated in the determined subscription;
    selecting a selected network address comprising one of the network addresses other than the changed network address;
    determining whether the selected network address can be used to establish a connection that enables communication between the determined target device and the source device; and
    in response to determining that the selected network address can be used to establish the connection, performing:
      indicating to use the selected network address for communication with the determined target device; and
      providing the selected network address to the determined target device indicated in the determined subscription for the determined target device to use to send messages to the source device.

13. The system of claim 12, wherein the operations of determining whether the selected network address can be used to establish the connection comprises:
  determining whether the source device can communicate with the target device; and
  determining whether the determined target device can communicate with the source device in response to determining that the source device can communicate with the target device, wherein the determination is made that the selected network address can be used to establish the connection in response to determining that the source device can communicate with the target device and the target device can communicate with the source device.

14. The system of claim 12, wherein the determining of whether the selected network address can be used to establish the connection comprises:
    causing an invocation of a connectivity test method on the determined target device to cause the determined target device to communicate a test message to the selected network address; and
    determining whether a test message is received from the determined target device sent to the selected network address, wherein the determination is made that the selected network address can be used to establish the connection in response to determining that the test message was received from the determined target device.

15. The system of claim 12, wherein the operations further comprise:
    determining a communication protocol supported by the determined target device;
    maintaining connectivity test procedures for different communication protocols, wherein each connectivity test procedure invokes operations to cause the determined target device to send a test message using the selected network address;
    determining the connectivity test procedure provided for the communication protocol supported by the determined target device;
    executing the determined connectivity test procedure to cause the determined target device to communicate using the selected network address; and
    determining whether a test message is received from the determined target device using the selected network address, wherein a determination is made that the selected network address can be used to establish the connection in response to determining that the test message was received from the determined target device.

16. The system of claim 12, wherein the determining whether the selected network address can be used to establish a connection that enables communication with the determined target device comprises:
    creating a temporary subscription identifying the selected network address and the determined target device;
    generating a temporary event listener to listen for messages from the determined target device on the selected network address; and
    invoking a procedure on the determined target device to cause the determined target device to communicate a message using the selected network address, wherein a determination is made that the selected network address can be used to establish the connection in response to the temporary event listener receiving the message.

17. The system of claim 12, wherein the operations further comprise:
    determining that the network addresses other than the changed network address cannot be used to establish the connection that enables communication with the determined target device; and
    in response to determining that the network addresses other than the changed network address cannot be used to establish the connection, performing:
        determining network configuration settings previously used to communicate with the determined target device before detecting the change; and
        using the determined network configurations settings with one of the network addresses other than the changed network address for communication with the determined target device.

18. The system of claim 17, wherein the determining of the network configuration settings previously used to communicate with the determined target device comprises:
    selecting one of a plurality of instances of network configuration settings for the determined target device, wherein the instances of network configuration settings are used for communication with the determined target device over one or more networks, wherein each instance of the network configuration settings identifies a target network address and communication protocol to use to communicate with the determined target device.

19. The system of claim 12, wherein the operations further comprise:
    deleting the determined subscription; and
    creating a new subscription identifying the determined target device and the selected network address.

20. The system of claim 15, wherein the operations further comprise:
    determining whether the determined target device supports at least one additional communication protocol in response to determining that the test message is not received from the determined target device after executing the operations of the determined connectivity test procedure; and
    selecting one of the determined at least one additional communication protocol, wherein the operations of determining the connectivity test procedure, executing the operations of the determined connectivity test procedure, and determining whether the test message is received are performed with respect to the selected additional communication protocol.

21. The system of claim 16, wherein in response to determining that the selected network address can be used to establish the connection, further performing:
    invalidating the temporary event listener and the temporary subscription;
    creating a new subscription identifying the determined target device and the selected network address; and
    generating an event listener to listen for messages from the determined target device on the selected network address.

22. The system of claim 18, wherein the determining the network configurations settings previously used comprises:
    selecting one of the network addresses other than the changed network address;
    comparing a subnet of the selected network address with subnets of the target network addresses of the determined target device indicated in the instances of the network configuration settings; and
    determining one of the target network addresses of the determined target device having a subnet matching the subnet of the new network address, wherein the determined network configuration settings include the determined target network address of the determined target device having the subnet matching the subnet of the new network address.

* * * * *